United States Patent [19]
Nonaka et al.

[11] Patent Number: 5,148,069
[45] Date of Patent: Sep. 15, 1992

[54] RECESSED ROTATION DETECTORS FOR BRUSHLESS MOTORS

[75] Inventors: Tomoharu Nonaka; Hiroshi Makino; Masahiro Takahashi; Teiji Sata; Daisuke Yoshino, all of Kanagawa, Japan

[73] Assignee: Fuji Xerox Corporation Ltd., Tokyo, Japan

[21] Appl. No.: 726,368

[22] Filed: Jul. 5, 1991

[51] Int. Cl.$^5$ ................. H02K 21/14; H02K 29/14
[52] U.S. Cl. ..................... 310/68 R; 310/164; 310/90.5
[58] Field of Search ............. 310/67 R, 68 R, 90, 310/90.5, 268; 359/212, 216, 217, 218, 219; 360/84, 99.08; 384/115, 292, 625

[56] References Cited

U.S. PATENT DOCUMENTS

| | | | |
|---|---|---|---|
| 4,523,800 | 6/1985 | Yamashita et al. | 384/115 |
| 4,547,713 | 10/1985 | Langley et al. | 310/164 |
| 4,667,137 | 5/1987 | Macleod | 310/68 R |
| 4,734,603 | 3/1988 | von der Heide et al. | 310/68 B |
| 4,843,270 | 6/1989 | Dijken | 310/164 |
| 4,882,511 | 11/1989 | von der Heide | 310/67 R |

FOREIGN PATENT DOCUMENTS 2-231950  9/1990  Japan ........................ 310/164

Primary Examiner—William H. Beha, Jr.
Assistant Examiner—D. L. Rebsch
Attorney, Agent, or Firm—Finnegan, Henderson, Farabow, Garrett and Dunner

[57] ABSTRACT

An electric motor includes at least a stator core carrying toroidal coils wound thereon, a magnet provided in opposition to the stator core so as to constitute a part of a rotor, and magnetic flux detection elements for detecting changes in magnetic polarity of the magnet so as to control a current flowing in the toroidal coils. The stator is provided with a select number of cut portions at its open end. The number of cut portions is not less than that of the magnetic flux detection elements. The winding positions of the toroidal coils are considered in order to maintain magnetic symmetry, the magnetic flux detection elements being provided in the cut portions.

5 Claims, 3 Drawing Sheets

RECESSED ROTATION DETECTORS FOR BRUSHLESS MOTORS

BACKGROUND OF THE INVENTION

The present invention relates to an electric motor, and particularly relates to an electric motor having magnetic flux detection elements for detecting changes in magnetic pole of a rotating magnet. The pole changes are detected to control an electric current flowing in toroidal coils wound on a stator core in accordance with detection signals of the magnetic flux detection elements.

FIG. 1 shows a conventional electric motor. The drawing shows the case in which the conventional electric motor is used for driving rotation of a polygon mirror of an optical deflector.

In FIG. 1, the electric motor includes a shaft 1, dynamic-pressure generating grooves 1—1, a housing 2, a rotary sleeve 3, a balance adjusting member attaching groove 4, a yoke 5, a magnet 6, a stator core 7, studs 8, a substrate 9, magnetic flux detection elements 10, a polygon mirror 11, a flange 12, screws 13, and a gap 15.

A rotor portion of the electric motor is mounted on the shaft 1 with the gap 15 therebetween. That is, the rotor portion is constituted by the rotary sleeve 3, the yoke 5 and the magnet 6 which are fixed to the rotary sleeve through pressing insertion, bonding, or the like, and further constituted by the polygon mirror 11 attached to the rotary sleeve 3 with the screws 13 through the flange 12.

On the other hand, a stator portion of the electric motor includes the housing 2, the shaft 1 fixed at its one end on the housing 2 through pressing insertion or the like, the stator core 7 similarly fixed to the housing 2 (being not shown, toroidal coils are wound on the stator core 7), the substrate 9 supported by the studs 8 attached to the stator core 7, the magnetic flux detection elements 10 planted on the substrate 9, and so on.

The magnet 6 is a permanent one, disposed so that a magnetic attracting force acts between the magnet 6 and the stator core 7 facing the magnet 6. The attracting force acts to prevent the opposite positions of the magnet 6 and the stator core 7 from shifting from each other in the axial direction of the electric motor (in the thrust direction).

That is, in FIG. 1, when the magnet 6 moves up, a component for drawing the magnet 6 down appears in the attracting force to thereby draw the magnet 6 down, while when the magnet 6 moves down, a component for drawing the magnet 6 up appears in the attracting force to thereby draw the magnet 6 up. Thus, the magnet 6 and the stator core 7 are kept in opposition to each other at a predetermined axial position by the magnetic attracting force. That is, a magnetic thrust bearing includes the magnet 6 and the stator core 7.

For example, Hall elements may be used as the magnetic flux detection elements 10. Each Hall element detects leakage flux of the magnet 6 to thereby detect whether an N pole or an S pole passes by the Hall element when the magnet 6 rotates.

Detection signals of the respective Hall elements are sent to a not-shown control portion through wirings printed on the substrate 9. On the basis of the detection signals, the control portion determines the direction of a current to be made to flow into the toroidal coils which are wound on the stator core 7 at various positions thereof. As a result, force is generated in the direction to maintain continuous rotation of the magnet 6, by the mutual operation of the magnet 6 and the stator core 7.

A radial bearing is a bearing for preventing the center of the rotation from shifting from a predetermined position even if force is exerted onto the shaft in the direction perpendicular to the shaft. In the electric motor shown in FIG. 1, a dynamic-pressure air bearing is used as the radial bearing. The dynamic pressure is generated by the dynamic pressure generating grooves 1—1.

When the rotary sleeve 3 rotates, a high-pressure air layer is generated by the dynamic-pressure generating grooves H around the shaft 1 (the portion of the gap 15). The rotary sleeve 3 is supported by the pressure in the state where the rotary sleeve 3 is floating from the shaft 1.

Although the dynamic-pressure generating grooves are formed in the shaft 1 at its outer circumference in the example, the dynamic-pressure generating grooves may be formed in the rotary sleeve 3 in its inner wall.

The air layer operates so as to maintain the center of rotation of the rotor portion. For example, if the rotary sleeve 3 shifts right in FIG. 1, the right gap is made larger so that the pressure in the gap at this position becomes lower than that before the rotary sleeve 3 shifts. At this time, the left gap becomes smaller so that the pressure in the gap at this position becomes higher than that before the rotary sleeve 3 shifts. When the above-mentioned relation of the degree of pressure is established, the rotary sleeve 3 is pushed left so that the rotary sleeve 3 is finally returned to the original position.

The polygon mirror 11 has a polygonal shape when viewed from above in the axial direction, and the polygon mirror 11 has a number of mirror surfaces on its circumferential side surfaces, the mirror surfaces being irradiated with a light beam such as a laser or the like. If the polygon mirror 11 is rotated while the first mirror surface is being irradiated with a light beam, the direction of the light beam reflected from the first mirror surface is gradually changed. That is, the reflected light beam is deflected.

When the polygon mirror 11 is further rotated so that the first mirror surface is not irradiated with the light beam, a second mirror surface rotates to a position where it is irradiated with the light beam. A this time, deflection is performed by the second mirror surface similarly to that by the first mirror surface. Thus, the reflected light beam performs scanning within a range of a fixed angle. The scanning speed depends on the rotation speed of the polygon mirror 11.

However, one problem of the conventional electric motor described above is that much noise flux enters into the magnetic flux detection elements for detecting changes in magnetic pole of the rotating magnet so that S/N (the signal-to-noise ratio) is poor.

FIG. 2 is an enlarged view showing a peripheral portion of each of the magnetic flux detection elements of the conventional electric motor. The parts the same as or equivalent to those in FIG. 1 are referenced correspondingly. The reference numeral 16 designates a toroidal coil, 17, magnetic flux leaking from the toroidal coil, 18, magnetic flux passing through the stator core, and 19, magnetic flux of the magnet.

Conventionally, the magnetic flux detection elements 10 are provided in the lower middle portion between the magnet 6 and the stator core 7 so as to detect the magnetic flux 19 going to the stator core 7 from the magnet 6.

When a current is made to flow in the toroidal coils 16, magnetic flux is generated. Assuming that a current flows in the toroidal coils 16 in the direction shown by arrows, then a part of the generated magnetic flux passes, as the stator-core-passing-through magnetic flux 18, through the stator core 7 of a magnetic substance, and the remainder of the generated magnetic flux leaks out into the space as the toroidal-coil-leakage magnetic flux 17.

Also the toroidal coil leakage magnetic flux 17 is detected by the magnetic flux detection elements 10. However, the toroidal coil leakage magnetic flux 17 is not an object to be detected by the magnetic flux detection elements 10 but a mere noise component.

Thus, the ratio S/N of the magnetic flux detection elements 10 becomes poor under the influence of the toroidal coil leakage magnetic flux 17. Therefore, the changes in magnetic pole of the magnet 6 can not be detected with high accuracy.

SUMMARY OF THE INVENTION

It is therefore an object of the present invention to solve the above-mentioned problems in the prior art.

In order to attain the above object, according to the present invention, the electric motor comprises at least a stator core carrying toroidal coils wound thereon, a magnet provided in opposition to the stator core so as to constitute a part of a rotor portion, and magnetic flux detection elements for detecting changes in magnetic polarity of the magnet so as to control a current flowing in the toroidal coils, the stator being provided with cut portions at its lower end portions, the number of the niches is selected so as to be not smaller than that of the magnetic flux detection elements to thereby keep magnetic symmetry, the magnetic flux detection elements being provided in the niches respectively.

In the above configuration, the niches are formed at positions recessed from the surface of the stator core so that the toroidal coil leakage flux hardly exists in the niches and even if the toroidal coil leakage flux exists, the leakage flux is extremely weak.

Accordingly, the magnetic flux detection elements provided in the niches are hardly influenced by the toroidal coil leakage flux acting as noise magnetic flux.

As a result, the ratio S/N of the magnetic flux detection elements is so improved that changes in magnetic pole of the magnet can be detected with high accuracy.

DETAILED DESCRIPTION OF PREFERRED EMBODIMENT

Figure 1:
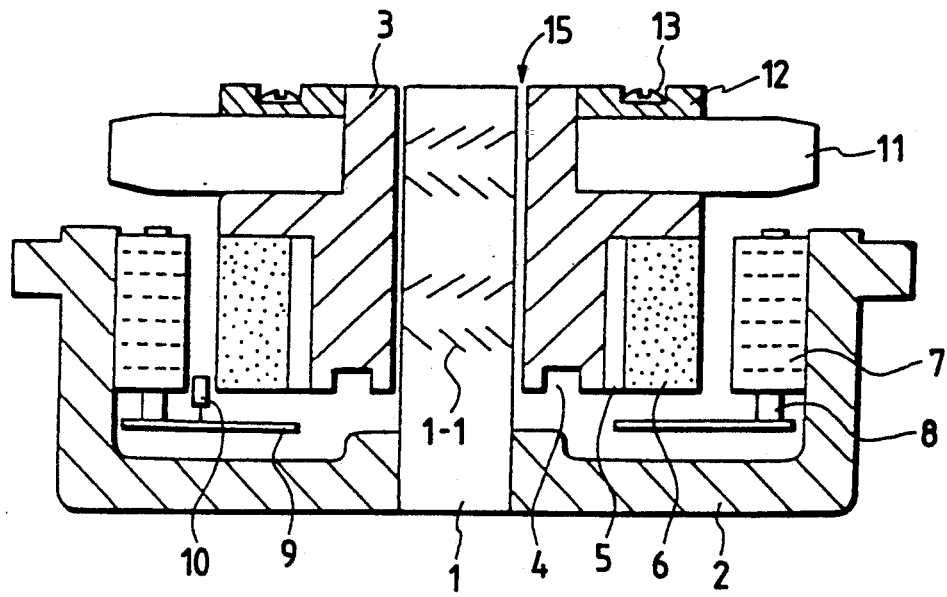
FIG. 1 is a view showing a conventional electric motor.
Figure 2:
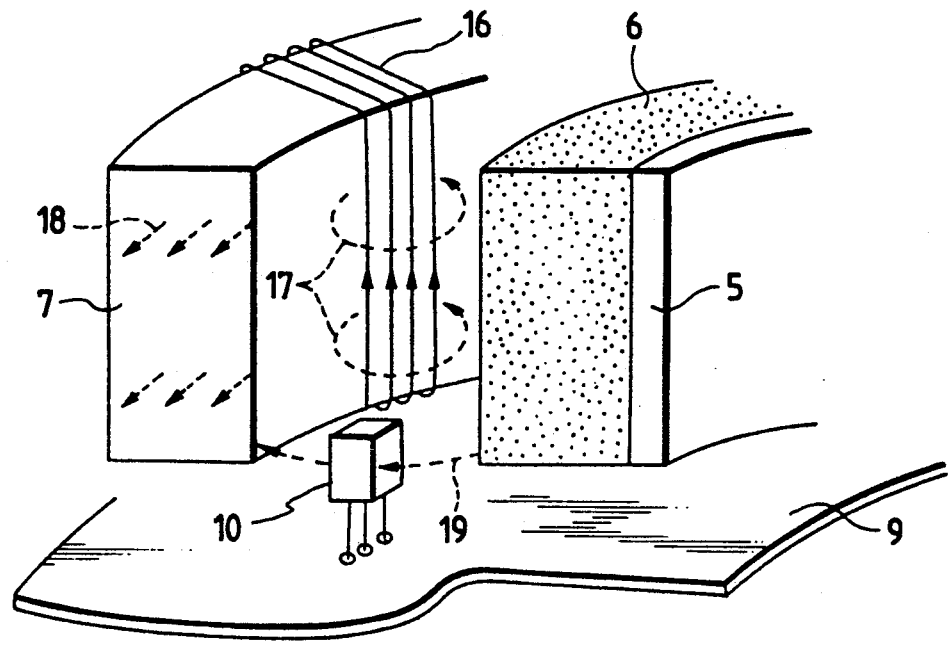
FIG. 2 is an enlarged view showing a peripheral portion of a magnetic flux detection element of the conventional electric motor.

Referring to the drawing, an embodiment of the electric motor according to the present invention will be described below.

Figure 3:
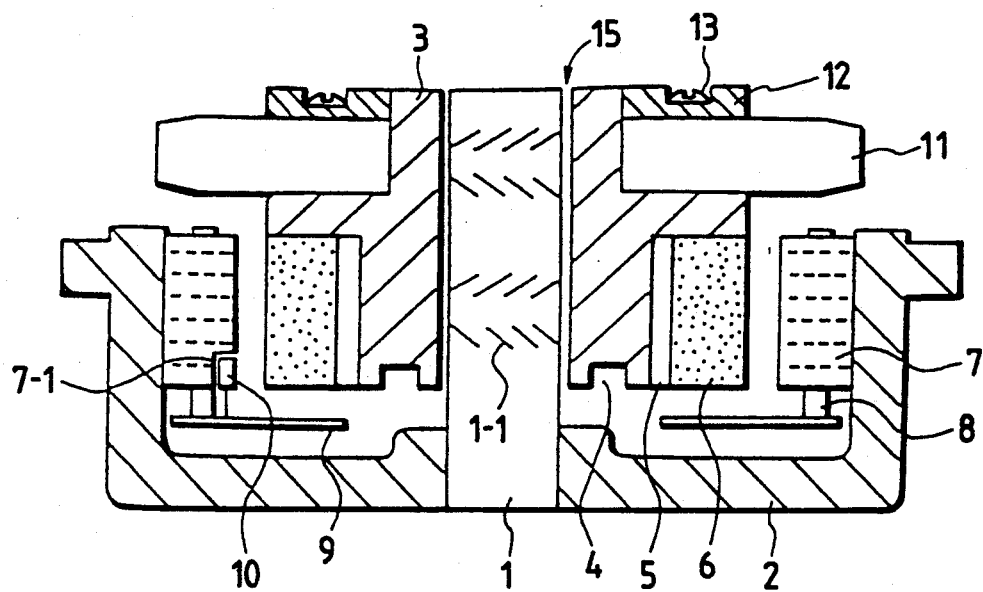
FIG. 3 is a view showing an embodiment of the electric motor according to the present invention.

FIG. 3 shows an embodiment of the electric motor according to the present invention. Similarly to the case of FIG. 1, FIG. 3 shows an example used for rotating a polygon mirror of an optical deflector.

The reference numerals correspond to those in FIG. 1. Further, in FIG. 3, the reference numeral 7-1 designates niches which are formed in the stator core at its lower end inside portions so as to be separated with gaps from the portions on which the toroidal coils are wound.

The configuration of this embodiment is different from the conventional electric motor in that the niches 7-1 are formed in the stator core 7 so that the magnetic flux detection elements 10 are provided in those cut portions 7-1.

Figure 4:
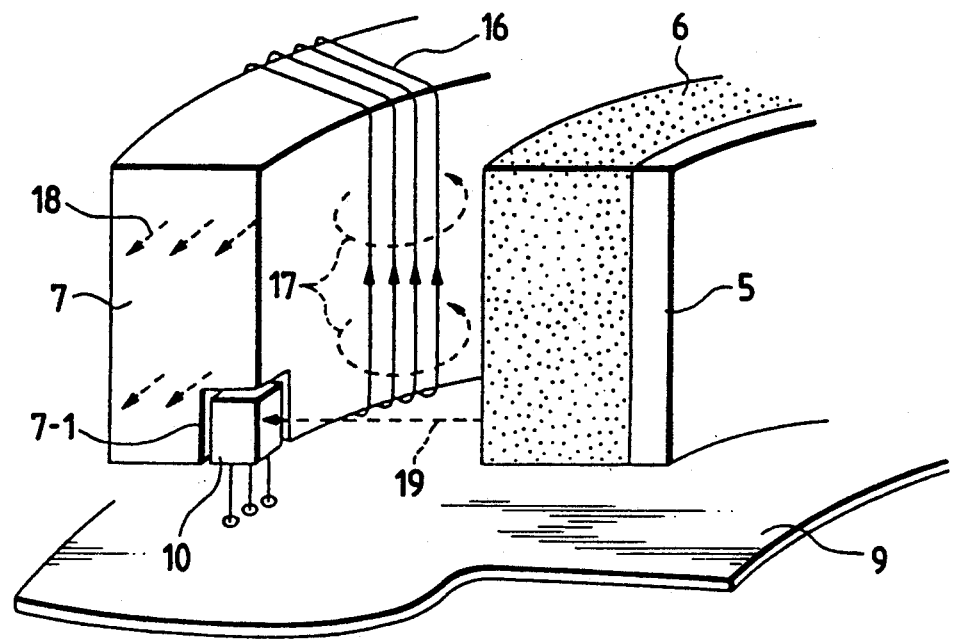
FIG. 4 is an enlarged view showing a peripheral portion of a magnetic flux detection element in the embodiment of the electric motor according to the present invention.

FIG. 4 is an enlarged view of a peripheral portion of each of the magnetic flux detection elements of the electric motor in this embodiment of the present invention. The reference numerals correspond to those in FIG. 1.

The provision of the magnetic flux detection elements 10 in the respective niches 7-1 can reduce the quantity of the toroidal coil leakage flux 17 entering into the magnetic flux detection elements 10 for the following reasons.

Although the toroidal coil leakage flux 17 is generated in a manner similarly to the conventional case, the portion where the toroidal coil leakage flux 17 is strongly distributed is the space portion between the magnet 6 and the stator core 7. On the contrary, if it is distributed at all the toroidal coil leakage flux is weakly distributed in the niches 7-1 provided in the portions separated from toroidal coils 16 and recessed from the surface of the stator core 7

Accordingly, the magnet flux detection elements 10 provided in the niches 7-1 respectively are hardly influenced by the toroidal coil leakage flux 17.

The stator-core-passing-through magnetic flux 18 does not appear in the niches 7-1 which are spaces each having a magnetic reluctance much larger than that of the stator core 7, but passes through the stator core 7 having a low magnetic reluctance. Accordingly, even if the magnetic flux detection elements 10 are provided in the niches 7-1 respectively, the magnetic flux detection elements 10 are never influenced by the portion of the magnetic flux which is passing through the stator core.

Further, the magnetic flux detection elements 10 are provided in the positions which were originally the surface portion of the stator core so that the magnetic flux detection elements 10 are in opposition to the magnet 6 so as to be able to receive faithfully the magnetic flux from the magnet 6.

As described above, the noise magnetic flux to be caught by the magnetic flux detection elements 10 is so reduced that the S/N ratio is improved. Accordingly, the changes in magnetic pole of the magnet 6 can be detected with high accuracy.

The stator core 7 constitutes a part of a magnetic circuit, and if the cut portions 7-1 are provided in the stator core 7 so as to have the same number as that of the magnetic flux detection elements 10, there is a probability of deterioration in the symmetry of the magnetic circuit in view of the number of the toroidal coils 16, toroidal. When the electric motor is viewed along the axis of rotation, if the symmetry of the magnetic circuit is impaired, the rotation is not smooth. Accordingly, it is necessary to provide the niches 7-1 in consideration of the symmetry of the magnetic circuit in the rotational direction. For applications which do not require smooth rotation, it is unnecessary to consider the above factors.

Figure 5:
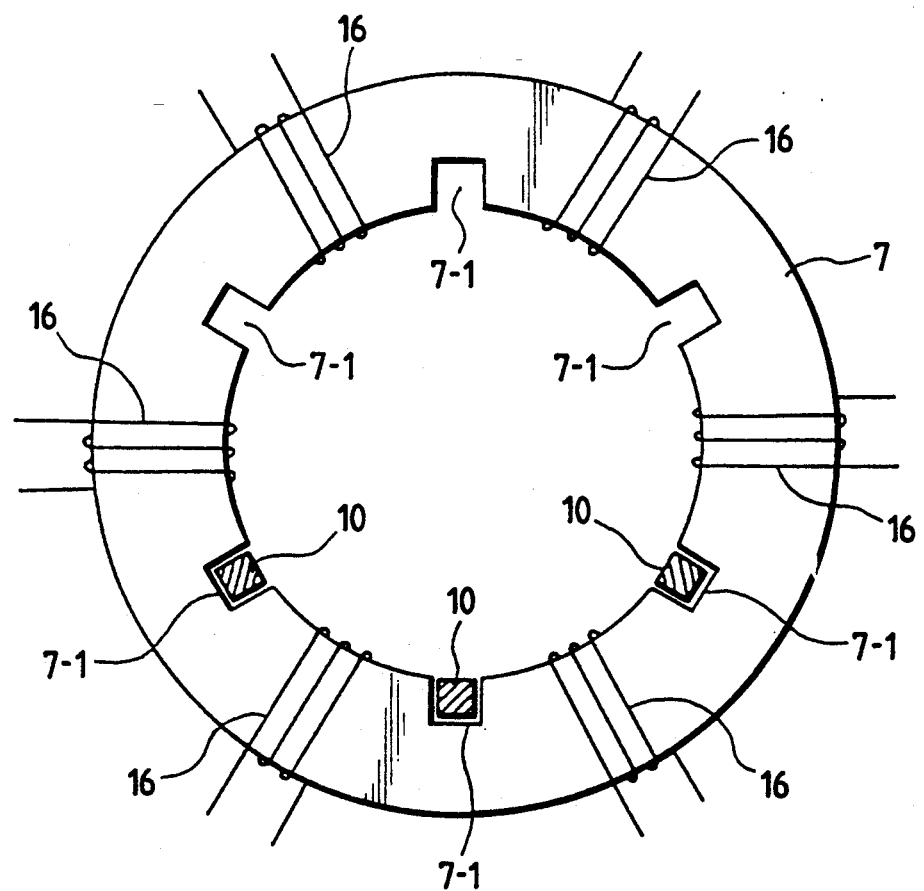
FIG. 5 is a view showing an example of a stator core viewed from its lower end portion.

FIG. 5 is a view showing an example of the stator core viewed from its lower end portion, in which the niches are provided in consideration of the symmetry of the magnetic circuit in the rotational direction.

In this example, six units of toroidal coils 16 are wound on the stator core 7. Even in such a case, generally, three magnetic flux detection elements 10 are provided in many cases. Accordingly, it suffices that the niches 7-1 are three in number merely for disposing the magnetic flux detection elements 10.

Since the toroidal coils 16 are however provided by six in number, the symmetry of the magnetic circuit in the rotational direction (in the circumferential direction) is lost if the cut portions are three in number.

In the case of FIG. 5, therefore, niches 7-1 having the same dimension are circumferentially symmetrically six in number as a whole, in consideration of relative positions of the toroidal coils 16. The magnetic flux detection elements 10 are provided in three of the six niches 7-1 respectively.

Further, in providing the magnetic flux detection elements 10 in the niches 7-1, various kinds of method may be considered. The magnetic flux detection elements 10 may be simply provided in the niches 7-1, or may be molded in the niches 7-1 with a mold member of a non-magnetic material.

As described above, according to the present invention, in the electric motor having magnetic flux detection elements for detecting changes in magnetic pole of a rotary magnet so as to control a current flowing in toroidal coils wound on a stator core in accordance with detection signals of the magnetic flux detection elements, the magnetic flux detection elements are provided in cut portions formed in the stator core at its lower end portion so as not to be influenced by leakage flux due to the toroidal coils wound on the stator core, so that the SN ratio of the magnetic flux detection elements can be improved.

As a result, changes in magnetic pole of the magnet can be detected with high accuracy. For example, in the case where the electric motor is used for rotating a polygon mirror of an optical deflector, the accuracy of the rotation can be improved. Since the capacity for detecting magnetic flux is improved (that is, noise is hardly detected, to improve the SN ratio in magnetic flux detection), sudden rotational unevenness is never caused in the electric motor by sudden external noise.

While the present invention has been described above with respect to a single preferred embodiment thereof, it should of course be understood that the present invention should not be limited only to this embodiment but various changes or modifications may be made without departure from the scope of the invention as defined by the appended claims.

What is claimed is:

1. An electric motor comprising:
   a housing;
   a magnetic yoke;
   a shaft mounted in said housing;
   a sleeve mounted for rotation on said shaft, forming a gap around said shaft;
   a stator core secured to said housing for carrying toroidal coils wound thereon;
   a magnet secured by the magnetic yoke to an outer cylindrical wall of said rotary sleeve and disposed across an air gap from the stator core so as to constitute a part of a rotor, and
   magnetic flux detection elements for detecting changes in magnetic polarity of the magnet so as to control a current flowing in the toroidal coils, the stator core having niches disposed at one axial end, the number of the niches being selected so as to be not less than that of the magnetic flux detection elements, the niches being selected with respect to the stator core to maintain magnetic symmetry to the toroidal coils, the magnetic flux detection elements being provided inside the niches respectively so as to minimize the adverse effects of the magnetic flux leakage from the torodial coils.

2. An electric motor according to claim 1, wherein the number of said niches corresponds with the number of toroidal coils.

3. An electric motor according to claim 2, wherein the numbers of said magnetic flux detecting elements correspond to half the number of said niches.

4. An electric motor according to claim 1, wherein the niches comprise six niches, and said magnetic flux detection elements are provided in three of the six niches.

5. An electric motor according to claim 2, in which positions of said cut portions correspond with positions of said winding portions.

* * * * *